US010006360B2

(12) United States Patent
Schmidt

(10) Patent No.: US 10,006,360 B2
(45) Date of Patent: Jun. 26, 2018

(54) ROTARY DIRECTIONAL PRESSURE ENGINE

(71) Applicant: Brian Schmidt, Hilliard, OH (US)

(72) Inventor: Brian Schmidt, Hilliard, OH (US)

( * ) Notice: Subject to any disclaimer, the term of this patent is extended or adjusted under 35 U.S.C. 154(b) by 501 days.

(21) Appl. No.: 14/705,210

(22) Filed: May 6, 2015

(65) Prior Publication Data

US 2016/0326952 A1    Nov. 10, 2016

(51) Int. Cl.
| | | |
|---|---|---|
| *F02B 55/02* | (2006.01) | |
| *F02B 53/10* | (2006.01) | |
| *F02B 55/14* | (2006.01) | |
| *F02B 53/14* | (2006.01) | |
| *F01D 1/22* | (2006.01) | |
| *F01D 1/28* | (2006.01) | |
| *F01D 1/34* | (2006.01) | |
| *F01C 1/00* | (2006.01) | |

(52) U.S. Cl.
CPC ............ *F02B 55/02* (2013.01); *F01D 1/22* (2013.01); *F01D 1/28* (2013.01); *F01D 1/34* (2013.01); *F02B 53/10* (2013.01); *F02B 53/14* (2013.01); *F02B 55/14* (2013.01); *F01C 1/00* (2013.01); *Y02T 10/17* (2013.01)

(58) Field of Classification Search
CPC .......... F02B 55/02; F02B 53/10; F02B 53/14; F02B 55/14; F01D 1/22; F01D 1/28; F01D 1/34
USPC ........ 123/249, 246, 18 A, 18 R, 43 A, 43 R, 123/200; 418/183, 196; 92/172, 177
See application file for complete search history.

(56) References Cited

U.S. PATENT DOCUMENTS

| | | | | |
|---|---|---|---|---|
| 710,756 A | * | 10/1902 | Colbourne | .......... F04C 15/0026 |
| | | | | 418/135 |
| 1,349,882 A | * | 8/1920 | Homan | ..................... F01C 1/28 |
| | | | | 123/246 |
| 1,874,239 A | | 8/1932 | Cannizzaro | |
| 1,923,500 A | * | 8/1933 | Northey | .................. F02B 53/00 |
| | | | | 123/214 |
| 2,097,037 A | | 10/1937 | Northey | |
| 2,097,881 A | * | 11/1937 | Hopkins | ................... F01C 1/24 |
| | | | | 123/246 |
| 3,050,011 A | | 8/1962 | Karl et al. | |
| 3,174,274 A | * | 3/1965 | Frye | ........................ F01C 1/126 |
| | | | | 123/221 |

(Continued)

FOREIGN PATENT DOCUMENTS

| | | | | |
|---|---|---|---|---|
| FR | 2349734 A1 | * | 11/1977 | ................ F01C 1/28 |
| FR | 2652391 A1 | | 3/1991 | |

*Primary Examiner* — Jason T Newton
(74) *Attorney, Agent, or Firm* — Standley Law Group LLP; Eric Gayan; Bradley Marzola

(57) ABSTRACT

A rotary directional pressure engine having a case within which a plurality of rotors rotate in parallel. The rotors include asymmetrical cavities on the circumferential faces thereof, which cavities function to move air and/or other gases into a combustion chamber area during an intake phase, to cooperatively form a combustion chamber during an ignition and combustion phase, and to move exhaust gases to the area of one or more exhaust ports for removal from the engine during an exhaust phase. Continued rotation of the rotors is accomplished by harnessing and properly directing the forces of combustion against the asymmetrical cavities of the rotors.

20 Claims, 8 Drawing Sheets

(56) References Cited

U.S. PATENT DOCUMENTS

| | | | |
|---|---|---|---|
| 3,207,425 A * | 9/1965 | Morse | F02B 53/00 123/246 |
| 3,214,907 A | 11/1965 | Martin | |
| 3,234,888 A * | 2/1966 | Wise | F04C 2/26 418/196 |
| 3,263,911 A * | 8/1966 | Hubrich | F04C 18/126 418/196 |
| 3,439,654 A * | 4/1969 | Campbell, Jr. | F01C 1/24 123/246 |
| 3,640,252 A * | 2/1972 | Spinnett | F02B 53/00 123/232 |
| 3,789,809 A | 2/1974 | Schubert | |
| 3,809,026 A * | 5/1974 | Snyder | F01C 1/28 123/246 |
| 3,935,840 A * | 2/1976 | Fisher | F01C 1/20 123/238 |
| 3,977,817 A * | 8/1976 | Monteil | F01C 1/20 418/117 |
| 4,007,715 A * | 2/1977 | Bonnell | F01C 1/14 123/239 |
| 4,324,537 A | 4/1982 | Meyman | |
| 4,934,325 A * | 6/1990 | Snyder | F01C 1/28 123/246 |
| 4,968,234 A * | 11/1990 | Densch | F01C 1/28 418/104 |
| 5,271,364 A * | 12/1993 | Snyder | F01C 1/28 123/241 |
| 5,341,782 A * | 8/1994 | McCall | F01C 1/28 123/246 |
| 5,860,802 A * | 1/1999 | Densch | F01C 1/28 418/104 |
| 6,224,358 B1 * | 5/2001 | Musser | F01C 1/28 418/196 |
| 6,250,278 B1 | 6/2001 | Mekler | |
| 6,655,344 B2 | 12/2003 | Sager | |
| 7,527,485 B2 * | 5/2009 | Coffland | F01C 1/28 123/246 |
| 7,753,011 B2 * | 7/2010 | Dick | F01B 19/00 123/18 R |
| 8,037,670 B2 | 10/2011 | Ikemura | |
| 8,215,935 B2 * | 7/2012 | Dehlsen | F01C 1/20 123/241 |
| 8,356,585 B2 | 1/2013 | Hathaway et al. | |
| 8,801,402 B2 | 8/2014 | Chu et al. | |
| 2009/0308347 A1 * | 12/2009 | Hathaway | F01C 1/28 123/242 |
| 2012/0160209 A1 | 6/2012 | Boucher | |
| 2014/0255232 A1 * | 9/2014 | Kerlin | F04C 18/165 418/55.2 |
| 2016/0326952 A1 * | 11/2016 | Schmidt | F02B 55/02 |

\* cited by examiner

ROTARY DIRECTIONAL PRESSURE ENGINE

TECHNICAL FIELD

Exemplary embodiments of the disclosure relate generally to a rotary-type combustion engine that does not rely on compression for operation.

BACKGROUND

A great number of combustion process engines are known. Very generally speaking, such engines typically operate by igniting a mixture of air and fuel to produce a movement of one or more components of the engine. The motive force supplied by the combustion of fuel is typically used to drive another device and to thereby produce work. The most common type of such an engine is most likely the internal combustion engine, which is the type of engine still used to power vehicles of numerous types (e.g., cars, trucks, motorcycles, airplanes). While internal combustion engines have existed since the 1800s and have advanced greatly since that time, internal combustion engines nonetheless continue to be inherently flawed in a number of ways.

Known internal combustion engines operate on the principal of compression. To this end, internal combustion engines, rotary or otherwise, have employed various methods of part articulation to achieve mechanical compression at the expense of an ultimately destructive and uneven application of force. Reliance on compression for operation is inefficient, produces considerable strain and wear on the engine components, and requires substantial componentry to combat such strain and wear. As a result, internal combustion engines are frequently complicated devices of considerable size and weight.

In light of the foregoing remarks, it should be obvious to one of skill in the art that eliminating the disadvantageous forces, vibrations, parasitic losses, heat, and space constraints resulting from the inherent mechanical directional change techniques required by existing internal combustion engines that rely on mechanical compression for operation, would be highly beneficial. For example, eliminating the need for components such as lobes, cams, reciprocating pistons and/or eccentric rotors, would permit the realization of an engine having vastly superior volumes of working gasses in proportion to the overall engine footprint, as well as an engine capable of sustainable high operating speeds if desired. Furthermore, the addition of timed ignition would permit such an engine to provide useful and efficient work output at all rotational speeds, unlike turbine engines which require continuous ignition and very high operating speeds.

Exemplary rotary directional pressure engine embodiments according to the disclosure are of the beneficial design described above. Consequently, exemplary rotary directional pressure engine embodiments according to the disclosure may provide the various associated advantages associated therewith.

SUMMARY

Exemplary engine embodiments according to the disclosure are internal combustion engines. An exemplary engine embodiment according to the disclosure is referred to herein as a rotary directional pressure engine (hereinafter also "RDP engine" for brevity). The rotary directional pressure terminology was selected as being merely descriptive of the general concept of herding the cumulative pressures of combustion in a desired direction, and is not to be considered as being any further limiting with respect to the design, construction or operation of such an engine. Exemplary RDP engine embodiments utilize said pressures of combustion for operation through intelligent design, as opposed to relying on typically employed compression techniques.

Generally speaking, exemplary RDP engine embodiments according to the disclosure include a case within which rotate in parallel a plurality of rotors. The rotors include asymmetrical cavities on the circumferential faces thereof, which cavities function to move air and/or other gases into a combustion chamber area during an intake phase, to cooperatively form a combustion chamber during an ignition and combustion phase, and to move exhaust gases to the area of one or more exhaust ports for removal from the engine during an exhaust phase.

The rotors are coupled to shafts such that the shafts rotate with the rotors. Output ends of the shafts are coupled to gearing that may be used to convert the rotational energy of the rotors into useful work. An exemplary RDP engine will typically require no rotor seals, as there is no mechanical compression attempted. The rotors and shafts of each rotor assembly spin concentrically and the rotor assemblies are synchronized by timing gears located in the gearing section of the case. A stationary central deflector may be used to direct working forces of combustion toward the most advantageous fulcrum points of the rotors upon fuel ignition.

Exemplary RDP engine embodiments are of non-interference design and, as mentioned above, do not require a compression stroke. As a result, there are no concerns regarding engine self-destruction upon timing loss, and the fuel used to power the engine may itself additionally function as both a lubricant and momentary hydraulic seal for the rotors. Exemplary RDP engine embodiments may also employ a dual intake design that helps to inherently optimize the atomization and mixing of air and fuel in the combustion chamber.

Other aspects and features of the invention will become apparent to those skilled in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and.

DETAILED DESCRIPTION OF THE EXEMPLARY EMBODIMENTS

Figure 1:
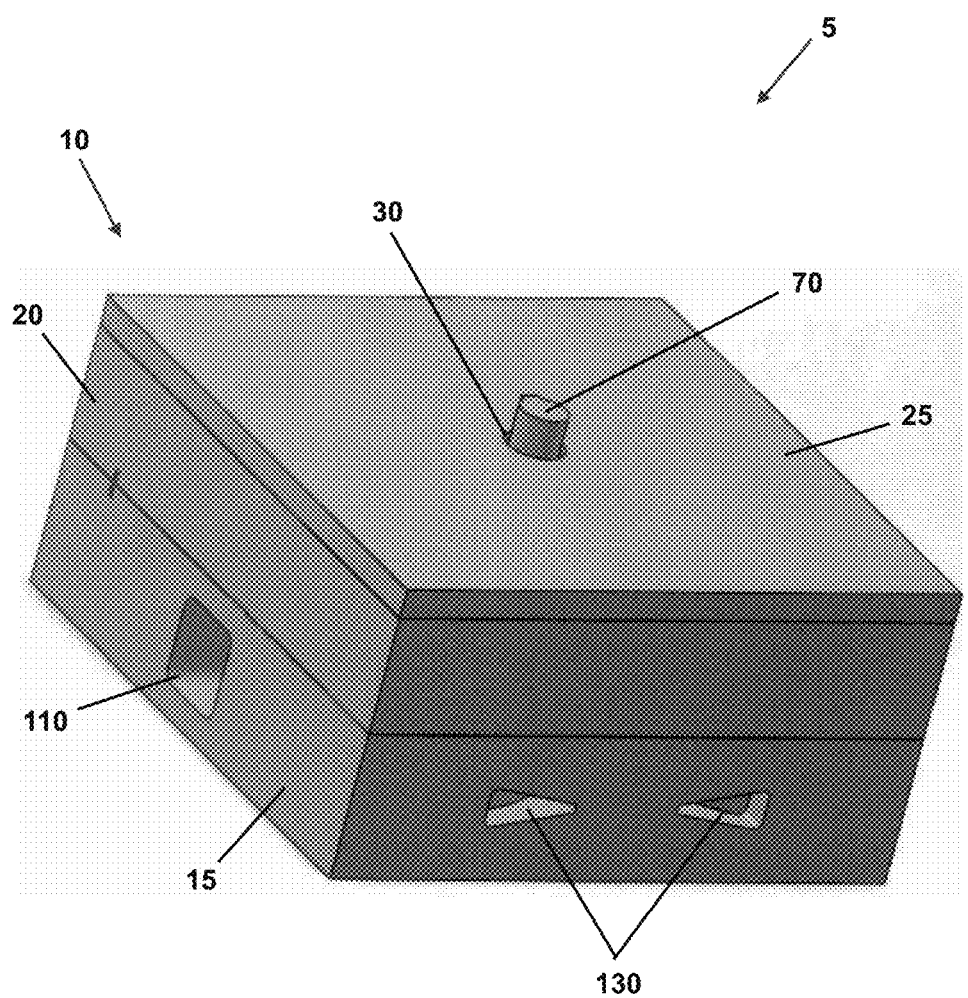
FIG. 1 is a perspective view depicting one exemplary and assembled rotary directional engine according to the disclosure.

One exemplary embodiment of an assembled RDP engine 5 according to the disclosure may be observed in FIG. 1. As shown, this RDP engine 5 includes a multi-section case 10 comprised of a base (rotor) section 15, an adjacent (gear) section 20, and a cover 25 that closes an open end of the gear section of the case in a sealing fashion. An engine output shaft 70 can be shown to protrude from the gear section 20 of the case 10 through an appropriately sealed aperture 30 provided in the cover 25.

In this exemplary embodiment, the case 10 is comprised of separate rotor and gear sections 15, 20, each of which is substantially in the form of a box of some depth having a bottom wall but an open top. In other embodiments, it is possible that a more unitary case may be utilized. For example, alternative embodiments may employ a case having a substantially unitary rotor and gear section, with a separating plate that may be installed between the rotor section and gear section after the rotors and other necessary components are installed being substituted for the bottom wall of the gear section 20 of the case 10 of FIG. 1. Other case designs may also be possible, including cases of different size and shape.

Figure 2:
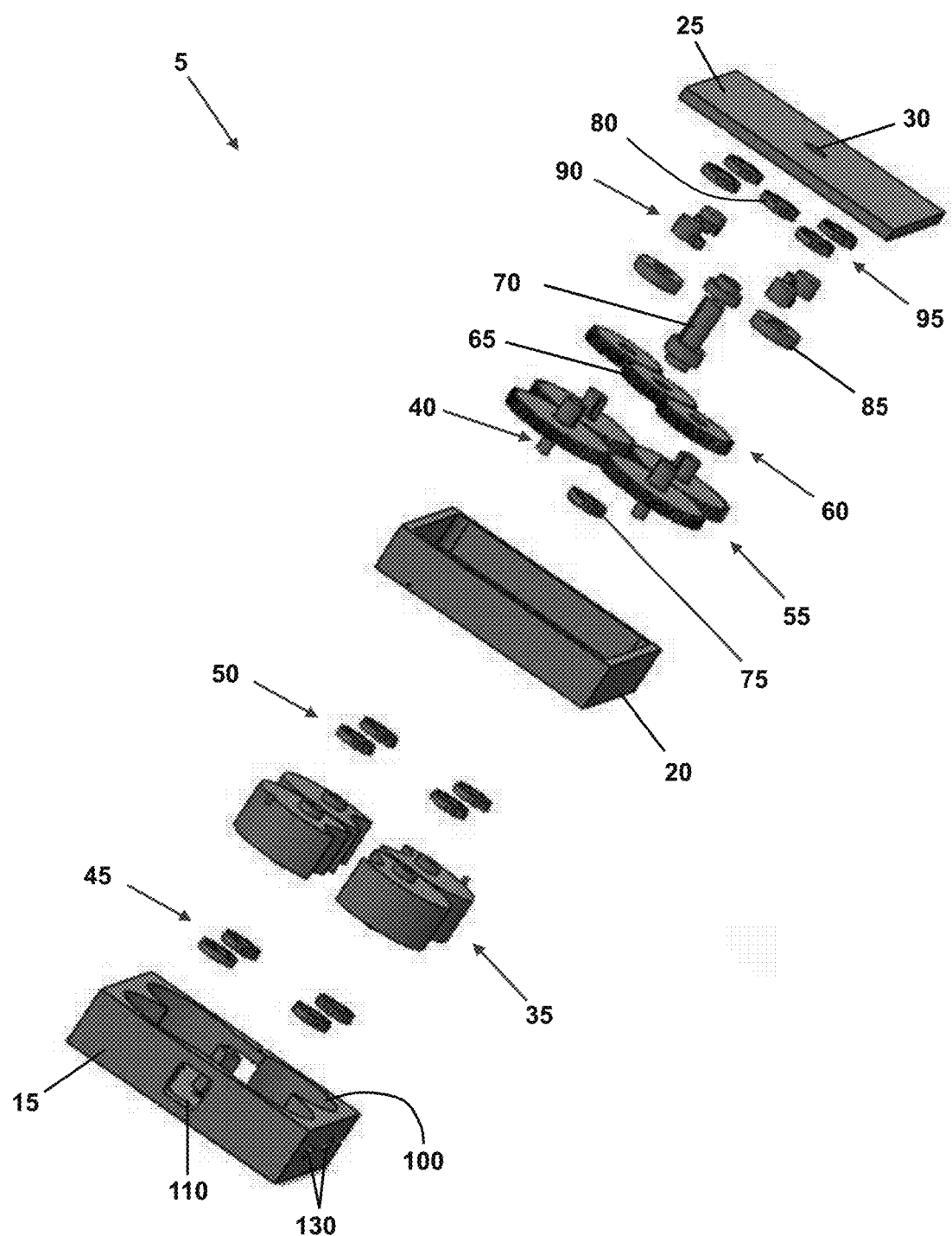
FIG. 2 is an exploded perspective view of one exemplary rotary directional engine according to the disclosure.

An exploded view of the exemplary RDP engine 5 of FIG. 1 is illustrated in FIG. 2. In addition to the case components 15, 20, 25, this exemplary RDP engine 5 can be seen to also generally include four non-cylindrical rotors 35 that are individually keyable or otherwise connectable to corresponding parallel shafts 40 such that the rotors 35 and the shafts 40 will rotate harmoniously within the rotor case 15 when the engine is assembled. A set of lower rotor assembly bearings 45 and a set of intermediate rotor assembly bearings 50 are provided for location in the rotor case 15 to facilitate rotation of the rotors 35 and associated shafts 40 and other rotor assembly components.

As can be better observed in the subsequent drawing figures, the rotor shafts 40 will extend through corresponding openings (not visible) in a bottom wall of the gear case 20 when the case sections are assembled, and will be coupled to intermeshing timing gears 55 located therein. In this particular embodiment, drive gears 60 are also provided and adapted for coupling to two of the like-rotating rotor shafts 40. An associated output gear 65 is also included and adapted to intermesh with and be driven by the drive gears 60 upon assembly. As explained in more detail below, the output gear will be centrally located between the drive gears 60 and timing gears 55 and is adapted for coupling to and rotation of the central output shaft 70, which will protrude through the cover 25 of the assembled case 10 as shown in FIG. 1 for coupling to the input of another device (e.g., a transmission, a pump, a blade, etc.). Lower and upper output shaft bearings 75, 80 are provided to facilitate rotation of the output shaft 70.

In this embodiment, spacers 85 are provided and adapted for placement over the two rotor shafts 40 to which no drive gear 60 is coupled, such that the spacers will reside on the top face of each associated timing gear 55. The spacers 85 are of the same thickness as the drive gears 60 in this exemplary embodiment, so as to present a planar upper surface in conjunction with the drive gears.

As described in more detail below, counterweights 90 are also provided in this exemplary embodiment for placement over the rotor shafts 40 and on top of the drive gears 60 and spacers 85, as necessary to balance the rotor assemblies.

An upper set of rotor assembly bearings 95 is provided to respectively receive the upper ends of the rotor shafts 40. The upper set of rotor assembly bearings 95 reside within the gear case 20 and are interposed between the upper ends of the rotor shafts 40 and the bottom wall of the cover 25.

Figure 3:
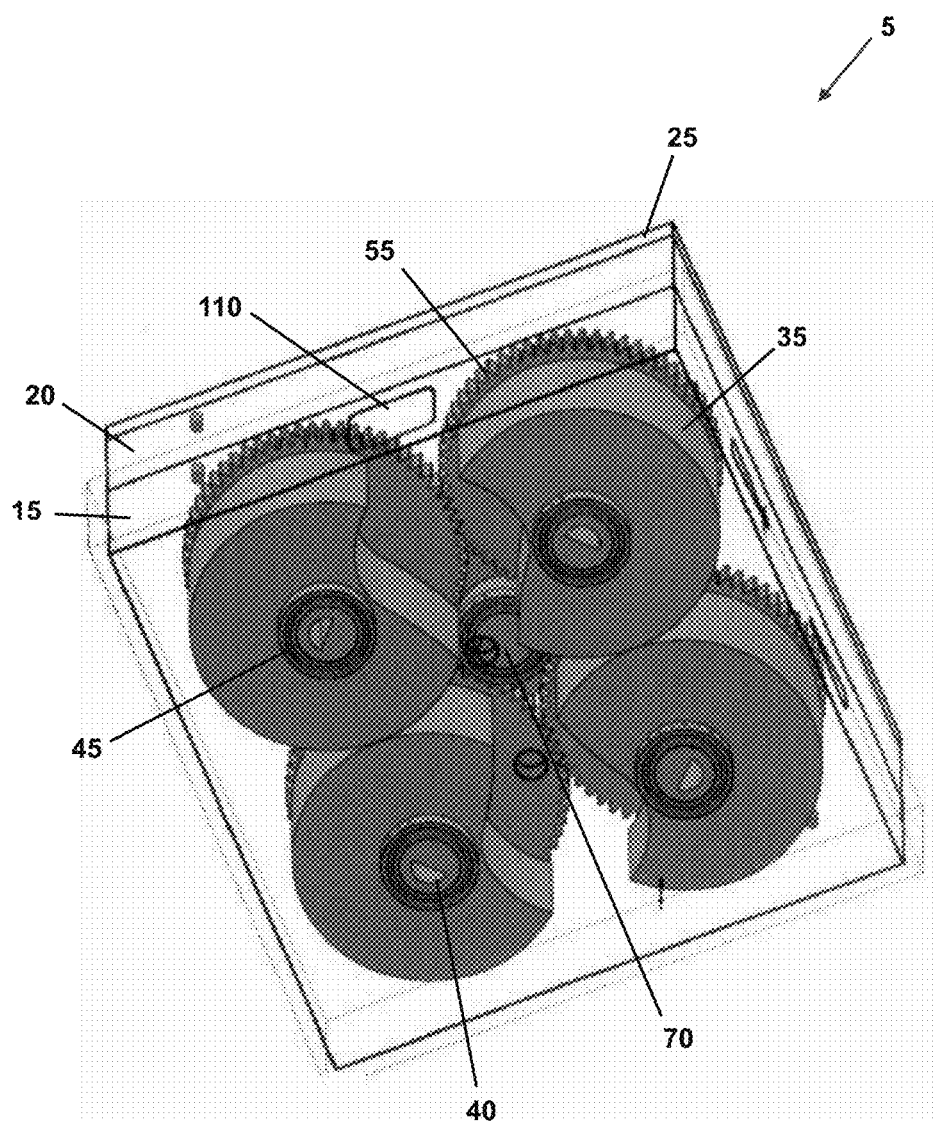
FIG. 3 is a partially transparent bottom-perspective view of the exemplary rotary directional engine of FIG. 1.
Figure 4:
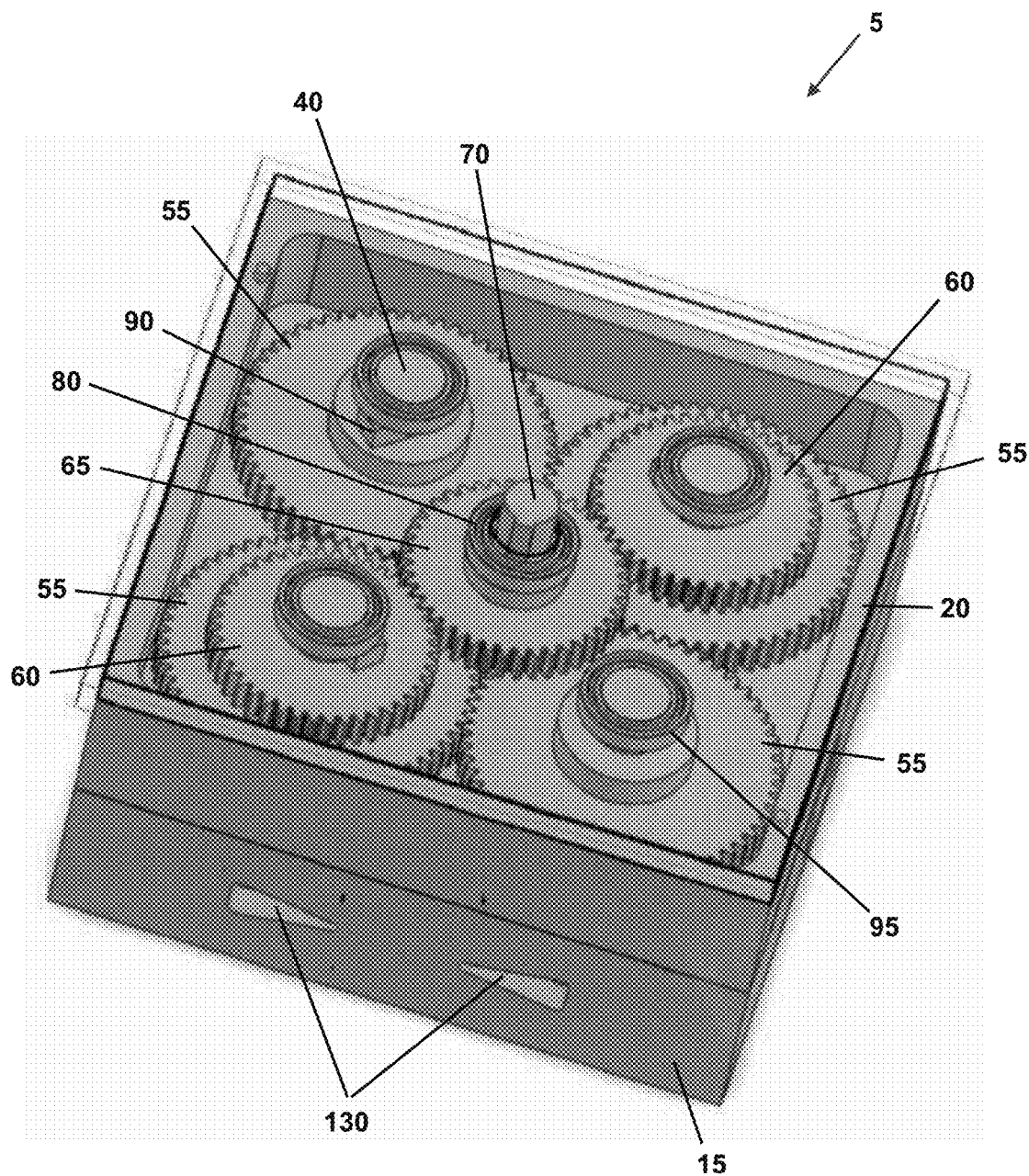
FIG. 4 is a partially transparent top-perspective view of the exemplary rotary directional engine of FIG. 1.

A better understanding of the assembled RPD engine 5 may be gained by reference to FIGS. 3-4. As may be understood from FIGS. 3-4, in conjunction with FIG. 2 and the foregoing disclosure, the four non-cylindrical rotors 35 reside and rotate within respective and correspondingly-shaped rotor wells 100 located in the rotor case 15.

It can be understood from FIGS. 3-4 that the rotors 35 of the assembled RPD engine 5 are each keyed or otherwise connected to corresponding parallel shafts 40 such that the rotors 35 and the shafts 40 rotate together when the engine is assembled and operating. The lower ends of the rotor shafts 40 respectively terminate within the corresponding set of lower rotor assembly bearings 45 such that there is no contact between the rotor shafts and the rotor case 15. Likewise, while not visible in the drawing figures, the intermediate set of rotor assembly bearings 50 ensure that there is no contact with the bottom wall of the gear case 20 where the rotor shafts 35 pass therethrough.

Referring now specifically to FIG. 4, it can be seen that the rotor shafts 40 of the assembled RPD engine extend into the gear case 20. The rotor shafts 40 are keyed or otherwise coupled to the timing gears 55, which are located in intermeshing contact within the gear case 20 and which function to synchronize the rotation of the rotor assemblies.

The drive gears 60 are shown to be keyed or otherwise coupled to two non-adjacent but like-rotating rotor shafts 40. The centrally-located output gear 65 encircles and is keyed or otherwise coupled to the output shaft 70. As can be observed, the output shaft is also centrally-located between the four timing gears 55 and the output gear 65 intermeshes with the two drive gears 60.

The aforementioned spacers 85 are installed over the two rotor shafts 40 to which no drive gear 60 is coupled and on the top face of each associated timing gear 55. Since the spacers 85 are the same thickness as the drive gears 60, a planar upper surface is presented by the combination of the spacers and the drive gears.

The balancing counterweights 90 are installed over and keyed or otherwise coupled to the rotor shafts 40 such that the counterweights and the rotor shafts rotate together during engine operation. The counterweights reside atop the drive gears 60 and spacers 85. In this example, the counterweights 90 are of a given asymmetrical shape. However, nothing herein shall be construed as limiting the counterweights to a given shape or size, or even to a given placement. Rather, when used, counterweighting and/or other types of balancing may be achieved by any technique understood by one of skill in the art. For example and without limitation, balancing may be achieved in other embodiments by way of drilling multiple holes in the rotors 35 at various locations.

The output shaft bearing 80 is installed to the output shaft 70 in the area of the aperture in the cover 25, such that there is no contact between the output shaft and the cover 25. The upper ends of the rotor shafts 40 are respectively received in the upper set of rotor assembly bearings 95, which reside within the gear case 20. The upper set of rotor assembly bearings 95 is interposed between the upper ends of the rotor shafts 40 and the bottom wall of the cover 25, such that there is no contact between the rotor shafts and the cover 25. Thus, the output shaft bearing, upper set of rotor assembly bearings 95, intermediate set of rotor assembly bearings 50, and lower set of rotor assembly bearings 45, operate in conjunction to ensure that all interactions between rotating points and the case 10 are shrouded by bearings. In one exemplary embodiment, the bearings used may be, for example and without limitation, sealed and lubricated bearings of the roller or needle type. In alternative embodiments, the bearings used may not be sealed bearings. In any case, the use of bearings and bearing assemblies ensures proper rotation of each rotor subassembly (i.e., rotor, and associated shaft and gearing).

The operation of the exemplary RPD engine 5 will now be described in more detail with reference to FIGS. 5-8. As shown in the partially transparent views of FIGS. 5-8 and as also described briefly above, the non-cylindrical rotors 35 reside and rotate within respective and correspondingly-shaped rotor wells 100 located in the rotor case 15. It should be understood, however, that the rotors 35 do not contact the rotor wells 100, nor any other part of the case. Likewise, the rotors 35 do not contact each other. Rather, the rotors 35 are located and dimensioned so as to rotate within the rotor wells 100 with a minimum achievable clearance between the rotors and the walls of the rotor wells. Similarly, the rotors 35 are located and dimensioned so as to rotate with a minimum achievable clearance between adjacent rotors. Hence, the RPD engine 5 is of a non-interference design.

As can be best observed in FIGS. 5-8, the rotors 35 rotate within the rotor wells 100 simultaneously and in a timed manner in the directions indicated by the arrows placed thereon. As can also be observed, each rotor 35 includes an asymmetrical cavity 105 located along the circumferential face thereof. In this embodiment, the asymmetrical cavities 105 of adjacent rotors are mirror images of each other, although this does not necessarily have to be the case in alternative embodiments. Likewise, the asymmetrical cavities of rotors of other embodiments may differ from the asymmetrical cavities 105 shown herein, as long as such asymmetrical cavities are able to acceptably move intake air, cooperatively form a combustion chamber, cause a desired rotation of the rotors when contacted by the forces of combustion, and remove or help to remove exhaust gases from the engine.

Figure 5:
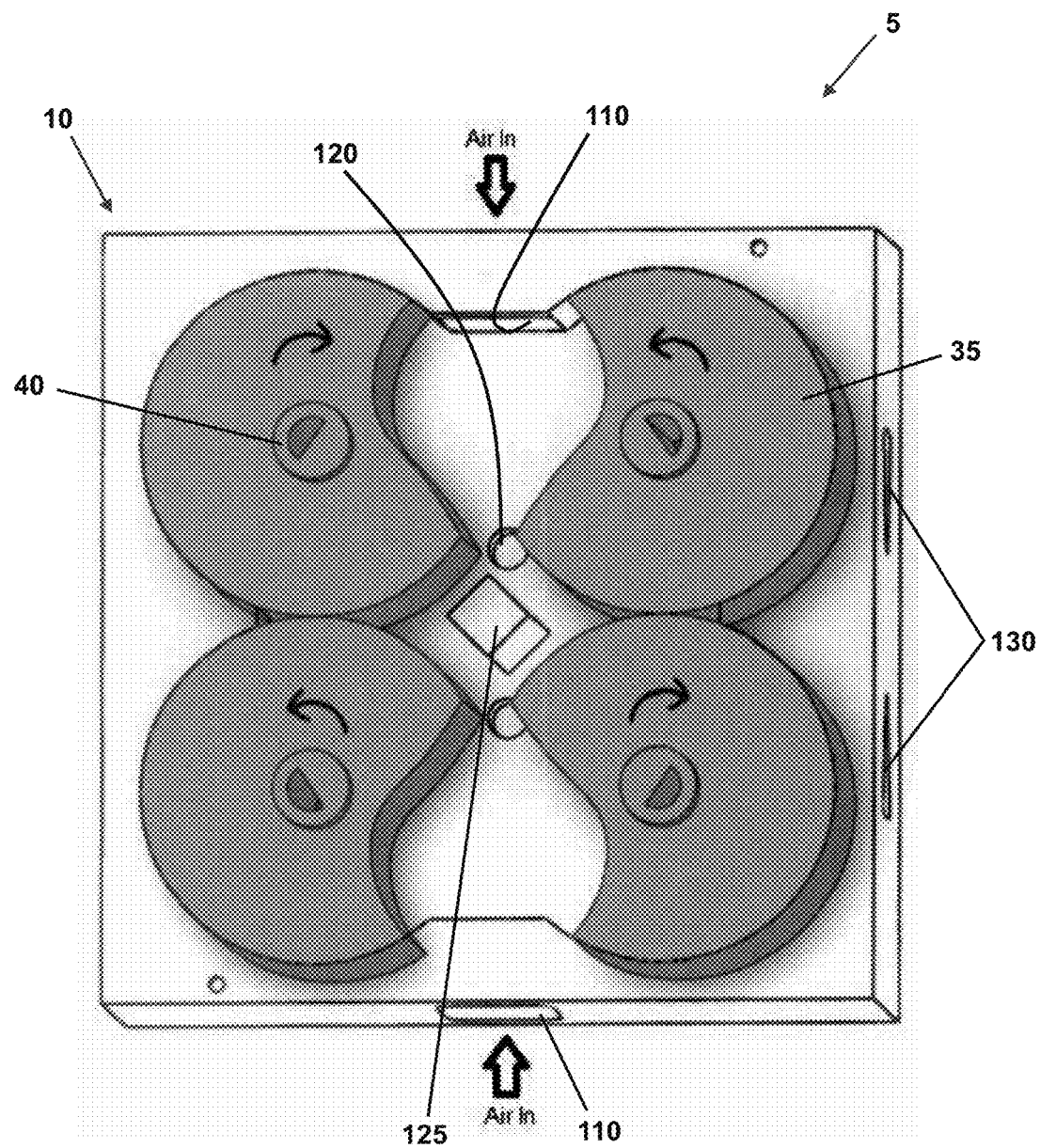
FIG. 5 is a partially transparent top view of an exemplary rotary directional engine according to the disclosure, where gearing and/or other drive elements have been removed for purposes of clarity and with the engine being in an intake phase.

The rotors 35 are shown in an intake position in FIG. 5. In the intake position, air and/or other gasses may enter the case 10 through one or more intake ports 110 that pass through the case. In this particular example, there are two intake ports 110, which are located on opposite sides of the case 10. The number, shape, size and/or precise location of the intake port(s) may vary in other embodiments. The intake ports 110 should be appreciated as both high volume and high velocity as no directional changes need occur. Additional benefits are achieved in the form of optimized air/fuel mixing and atomization, as the two intake charges will collide in the center of the device just prior to ignition.

Referring herein to the rotors 35 being in an intake position (or intake phase) is meant only to convey that the rotors 35 reside in a position in which air and or other gasses may enter the case 10. Thus, the rotors 35 need not be in the exact position shown in FIG. 5 to be in an intake position. Rather, the rotors 35 may be considered to be in an intake position for that period of time in which air or other gases are not blocked by the rotors from entering the intake ports 110 and passing to a centrally-located combustion area between the rotors (see below). In other words, the intake ports 110 do not have to be completely unblocked and perfectly framed by the asymmetrical cavities 105 of adjacent rotors 35—as shown in FIG. 5—for the rotors to be in an intake position.

Figure 6:
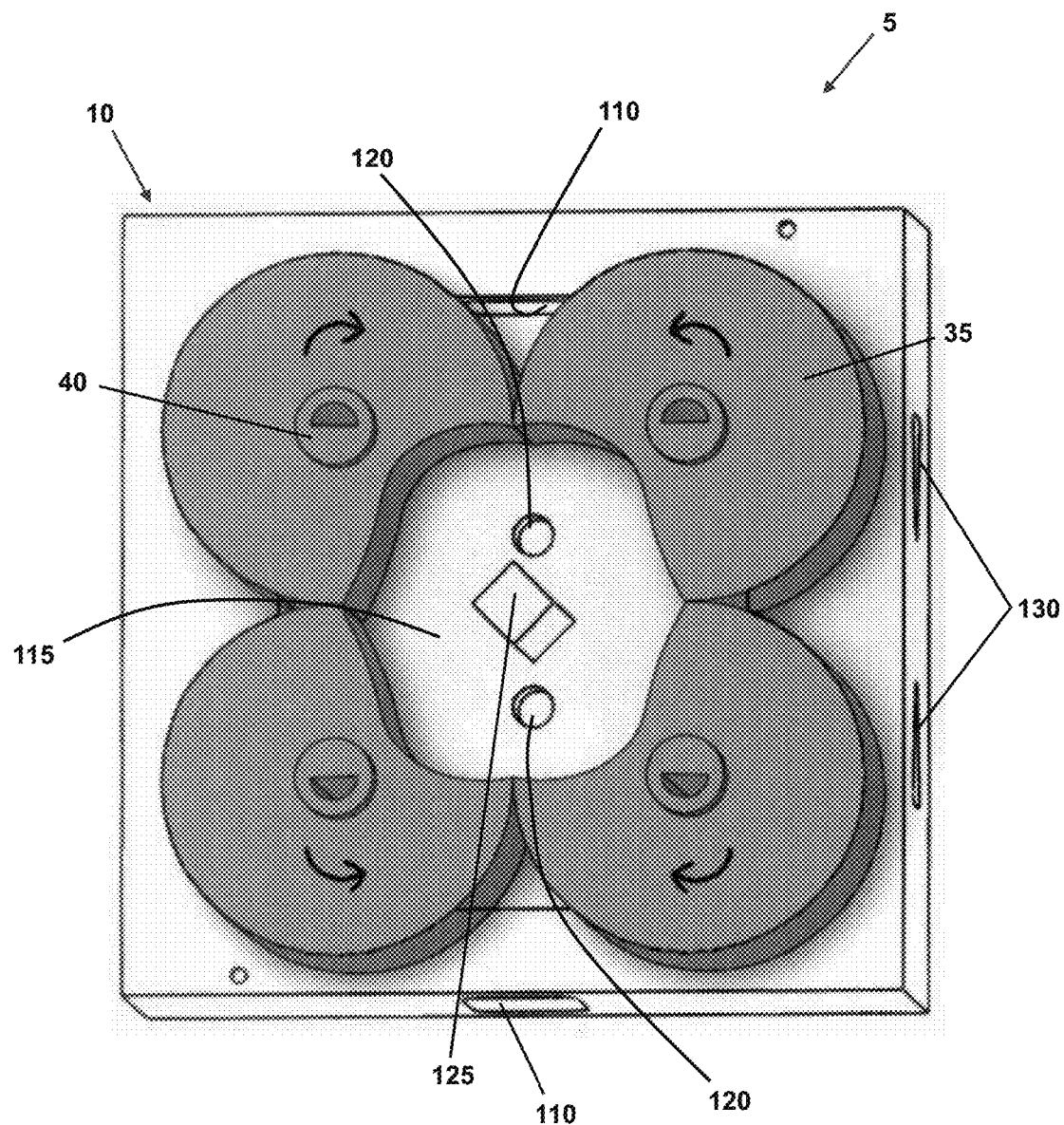
FIG. 6 is another partially transparent top view of the exemplary rotary directional engine of FIG. 5, with the engine in a combustion phase.

The rotors 35 are shown in a combustion position in FIG. 6. The combustion position (or phase) of the rotors 35 is generally achieved when, as shown in FIG. 6, the walls of the asymmetrical cavities 105 in the circumferential faces of adjacent rotors become aligned to define, in conjunction with the interior walls of the case 10, a substantially enclosed combustion chamber 115 within the rotor case 15.

An ignition device(s) is provided to ignite an air-fuel mixture that will be present in the combustion chamber 115 during an appropriate point of engine operation. In this particular example, ignition holes 120 are provided to receive ignition devices (not shown) such as, but not limited to, spark plugs, glow plugs, etc. There are two ignition holes 120 located within the combustion chamber 115 in the exemplary embodiment shown, however, the number, size and/or location of such ignition holes may vary in other embodiments. In any case, the positioning of the ignition devices within the ignition holes 120 is such that no interference with rotation of the rotors 35 occurs.

Figure 7:
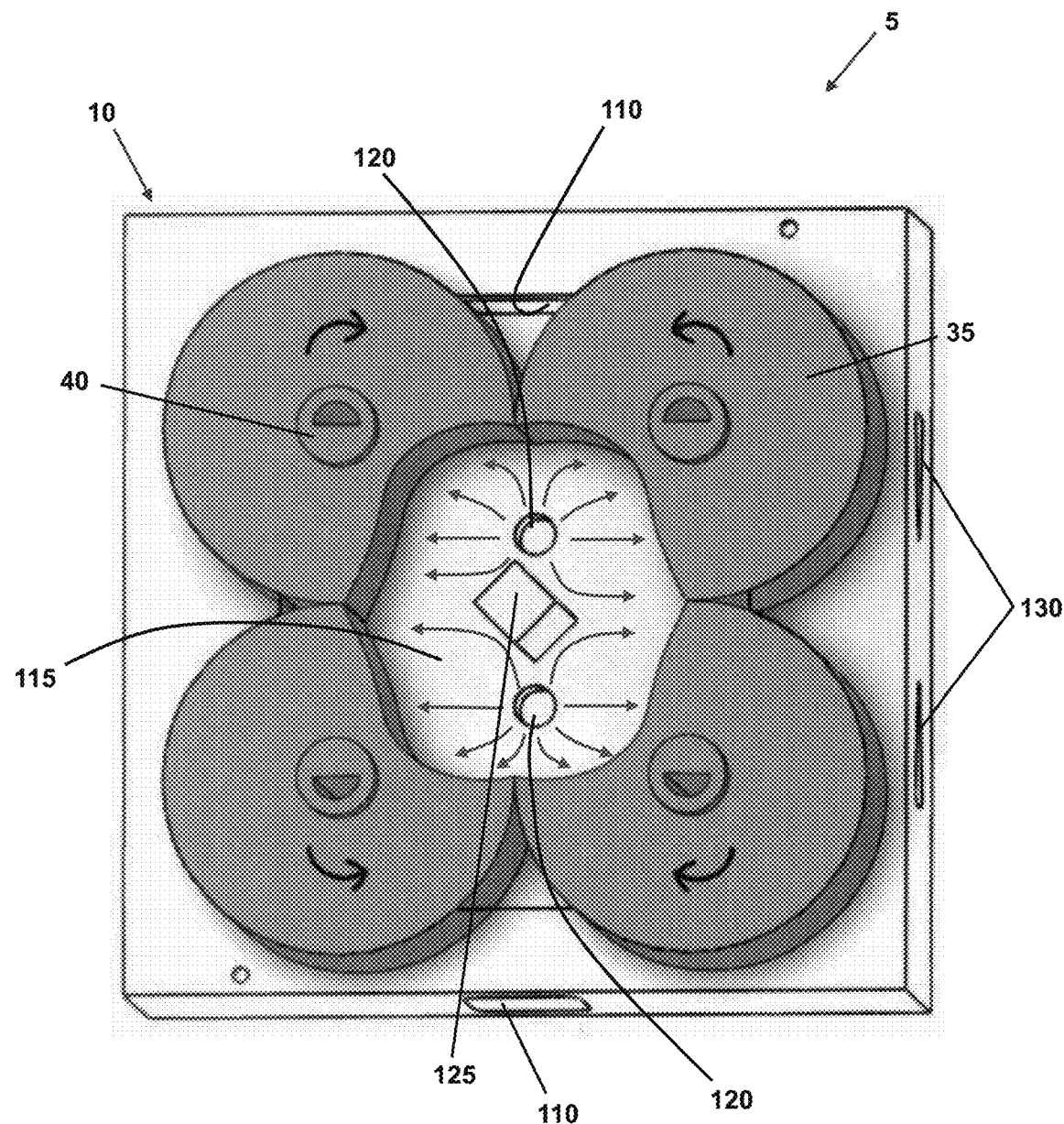
FIG. 7 shows the partially transparent top view of FIG. 6, with rotor rotating forces generated by fuel combustion being indicated.

As represented by the arrows in FIG. 7, once the air-fuel mixture within the combustion chamber 115 is ignited, the forces of combustion will expand outward against the walls of the asymmetrical cavities 105 in the circumferential faces of the rotors 35. The shape of the asymmetrical cavities 105 in the circumferential faces of the rotors 35 is such that the combustion forces impinging thereon are directed along the cavities in a manner that will further encourage rotation of the rotors 35 in each of their current directions of rotation. The rotational axis of each rotor 35 acts as a fulcrum while the long shallow portion of the cavity 105 wall acts as a lever, thereby converting the combustion forces into rotational mechanical work.

To further encourage the desired directions of the combustion forces, a combustion force deflector 125 may be located (preferably centrally located) within the defined space of the combustion chamber 115. The shape and orientation of the deflector 125 is such that combustion forces directed toward the deflector will be redirected toward the walls of the asymmetrical cavities 105 in the circumferential faces of the rotors 35. Thus, use of the deflector 125 may increase the efficiency of the RDP engine 5. The deflector 125 may also serve as a support and possible point of attachment for the bottom wall of the gear case 20.

Figure 8:
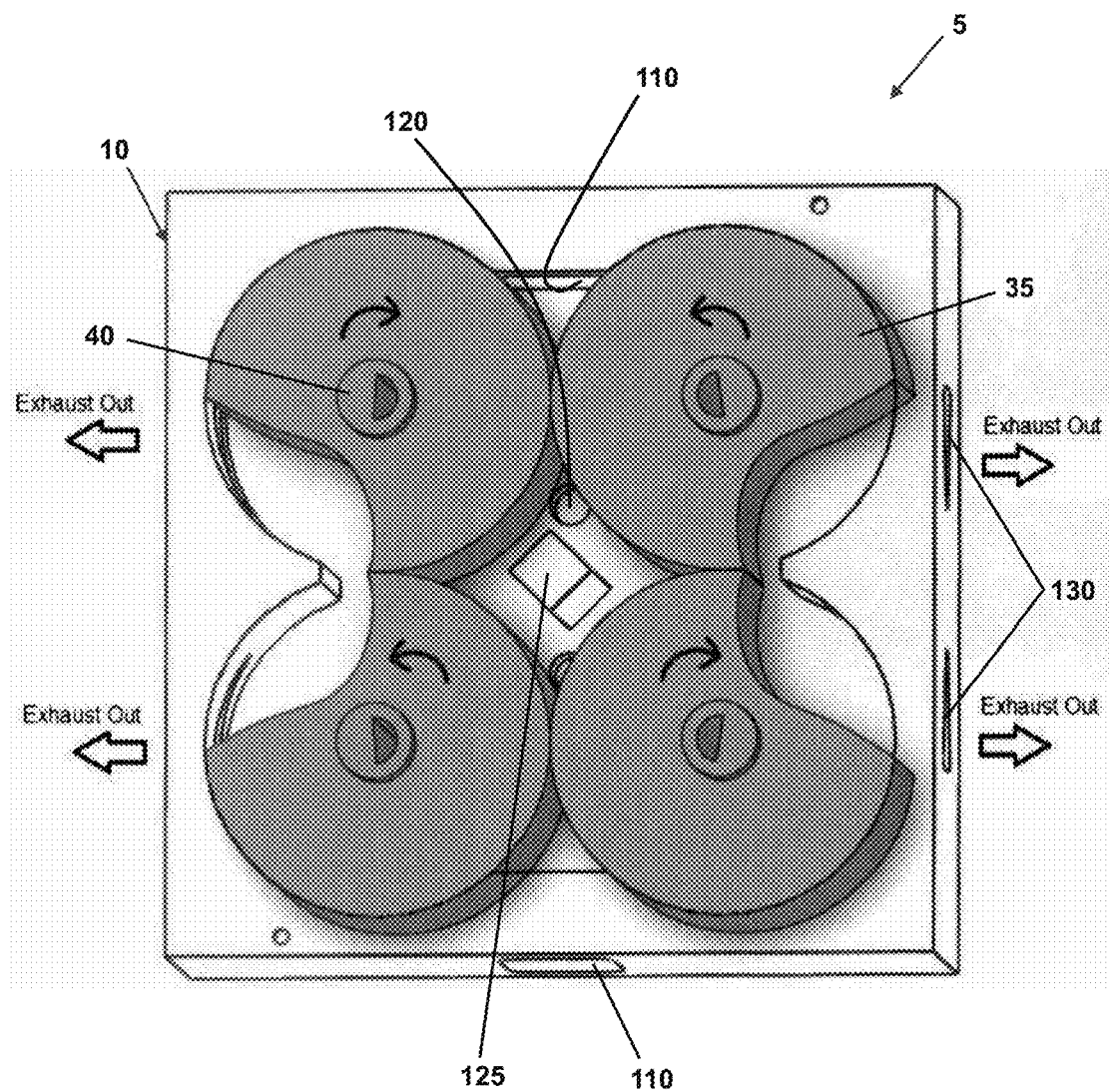
FIG. 8 is another partially transparent top view of the exemplary rotary directional engine of FIG. 5, with the engine in an exhaust phase.

The rotors 35 are shown in an exhaust position in FIG. 8. In the exhaust position, the rotors 35 have rotated to a position where the asymmetrical cavities 105 in the circumferential faces of the rotors 35 are exposed to one or more exhaust ports 130 that pass through the case 10. It should be appreciated that this rotation of the rotors creates a progressive aperture for exhaust gas exit, with the minimal initial horizon of alignment encouraging exhaust forces to further act upon the rotors in the desired direction of rotation until full alignment is reached, thereby permitting the widest available aperture for exhaust gas exit.

As a result of rotor rotation to the exhaust position, the exhaust gasses produced during combustion may exit the case 10 through the exhaust port(s) 130. In this particular example, there are four exhaust ports 130, which are located on opposite sides of the case 10. The number, shape, size and/or precise location of the exhaust port(s) may vary in other embodiments.

Referring herein to the rotors 35 being in an exhaust position (or exhaust phase) is meant only to convey that the rotors 35 reside in a position in which combustion gasses may exit the case 10. Thus, the rotors 35 need not be in the exact position shown in FIG. 8 to be in an exhaust position. Rather, the rotors 35 may be considered to be in an exhaust position for that period of time in which combustion gases are not blocked by the rotors from exiting the exhaust ports 130. In other words, the exhaust ports 130 do not have to be completely unblocked and perfectly framed by the asymmetrical cavities 105 of adjacent rotors 35—as shown in FIG. 8—for the rotors to be in an exhaust position.

Operation of the RDP engine 5 should be apparent to one of skill in the art in light of FIGS. 5-8 and the previous disclosure. That is, operation of the RDP engine 5 may be defined generally by the transition in rotation of the synchronized rotors 35 between the intake, combustion and exhaust positions illustrated in FIGS. 5-8, and the eventual return of the rotors to the intake position shown in FIG. 5.

In the course of rotor rotation, air and/or other gasses are moved by the asymmetrical cavities of the rotors during the intake phase toward a centrally-located combustion chamber area that will be formed by the rotors; fuel is added to the combustion chamber formed by the rotors and the case—either along with the air and/or other gases moved to the combustion chamber by the rotors during the intake phase or at some other point prior to combustion—and the air-fuel mixture is ignited during the combustion phase, whereby the forces of combustion are converted into rotational energy by the rotors for the purpose of doing useful work; and exhaust gases are removed by the asymmetrical cavities of the rotors during the exhaust phase to a location where the exhaust gases may exit the case before the rotors return to an intake position.

Fuel may be added to the combustion chamber 115 to mix with air and/or other gases present therein in various ways. For example, in some embodiments, fuel may be atomized and added to a stream of intake air or other gases entering the engine 5, such that the fuel becomes entrained in the air stream and travels to the combustion chamber 115 with the air stream. Alternatively, or in addition thereto, fuel may be directly added to the combustion chamber 115 in a metered manner by any technique known in the art including, but not limited to, carburetor or fuel injection techniques.

Because the rotors 35 are keyed or otherwise coupled to the rotor shafts 40, the rotational energy of the rotors will be transmitted to the output shaft 70 by way of the drive gears 60 and output gear 65. The timing gears 55 ensure that rotation of the rotors 35 remain synchronized at all times.

In the exemplary embodiment shown herein, a single ratio gear set of 1:1 is illustrated. However, it should be understood by and apparent to one of skill in the art that the rotor shafts and case could be extended in other designs to support multiple ratio gear-sets as found in any basic manual transmission, including a reverse gear when attached to the opposing set of shafts.

In embodiments of an RDP engine according to the invention, any known technique for timing the supply of fuel to the combustion chamber 115 with the proper rotational position of the rotors 35 and activation of the ignition devices may be employed. Thus, it can be understood that the RDP engine 5 is a timed ignition engine—not a continuous ignition engine like a turbine. Furthermore, because the RDP engine may operate at a low, zero or possibly even negative pressure, an RDP engine according to the disclosure is ideally suited for fitting with a forced induction system, which may be used to provide a forced flow of air and/or other gases through the intake port(s) and into the case of the RDP engine during at least the intake phase thereof.

The non-interference design of an RDP engine according to the invention combined with the absence of a compression stroke permits smooth operation and virtually no wear using the fuel itself as both a lubricant and momentary hydraulic seal for the rotors. The non-interference design also eliminates any concern about engine self-destruction if rotor timing is somehow lost. Beneficial rotor direction of rotation also aids in persuading ignited fuels from reversing back up through the intake ports. In comparison to typical internal combustion engines, exemplary RDP engine embodiments according to the invention also generally possess a very large ratio of combustion space to overall engine volume.

RDP engine embodiments according to the invention may have wide-ranging application. For example and without limitation, RDP engines may be produced on an extremely small to even a micro-scale, and may also be manufactured in sizes and with power outputs suitable for use in products from outdoor power equipment to vehicles of various types.

Various exemplary RDP engine embodiments are described in detail above for purposes of illustration and understanding of the general inventive concept. However, those of skill in the art will undoubtedly realize that many various changes and modifications to the designs and constructions disclosed are possible within the spirit and scope of the invention. For example, and without limitation, the number of rotors present in a RDP engine embodiment is not limited to the four rotors shown and described in the exemplary embodiments of the disclosure. A number of RDP engine modules may also be produced (whether like the exemplary RDP engine embodiments of the disclosure or dissimilar therefrom), and stacked or otherwise connected to form an aggregated, larger RDP engine. It should also be realized that a given RDP engine is not limited to a particular size. Rather, RDP engine embodiments are highly scalable depending on the application. For example, the component dimensions of a given RDP engine may be generally enlarged to satisfy high torque, low RPM applications, or the height of the components may be increased relative to the other component dimensions so as to yield longer rotors and a higher RPM engine that produces more power via an increased combustion volume.

Other changes and modifications within the scope of the invention are also possible. Therefore, while various exemplary embodiments have been described herein, the scope of the invention is not considered limited by such disclosure, and modifications are possible without departing from the spirit of the invention as evidenced by the following claims:

What is claimed is:

1. A rotary directional pressure engine, comprising: a substantially sealed case having a rotor section and a gear section; at least one intake port passing through a wall of the case and at least one exhaust port passing through the wall of the case; a plurality of non-contacting rotors adapted to rotate in parallel within the rotor section of the case and without contact therewith, each rotor coupled to a shaft that extends from the rotor section of the case into the gear section of the case and rotates with its associated rotor; an asymmetrical cavity located on a circumferential face of each rotor; at least one ignition device for igniting an air-fuel mixture within the engine; intermeshed timing gears located within the gear section of the case, each timing gear associated with each rotor shaft that extends into the gear section; at least one pair of intermeshed drive gears located in the gear section of the case and associated with a corresponding number of like-rotating rotor shafts; an output gear intermeshed with the drive gears; and an output shaft coupled to the output gear for rotation by rotational movement of the rotors.

2. The engine of claim 1, wherein each of the rotors rotate without contact within rotor wells in the rotor section of the case.

3. The engine of claim 1, further comprising bearings for facilitating rotation of the rotor shafts.

4. The engine of claim 1, wherein the asymmetrical cavities located on the circumferential faces of the rotors will become periodically aligned during rotor rotation to form, along with interior walls of the case, a substantially sealed combustion chamber.

5. The engine of claim 4, wherein the asymmetrical cavities located on the circumferential faces of the rotors are shaped so as to move intake air toward the combustion chamber during an intake phase of the engine and to move gases of combustion from the combustion chamber toward the at least one exhaust port during an exhaust phase of the engine.

6. The engine of claim 4, comprising a pair of intake ports, the intake ports being located in the case such that streams of air or other gases entering the case through the intake ports will be caused to collide within the combustion chamber.

7. The engine of claim 4, further comprising a fuel delivery mechanism for delivering a charge of fuel directly to the combustion chamber of the engine during a combustion phase thereof.

8. The engine of claim 1, further comprising a mechanism for adding atomized fuel to an airstream entering the at least one intake port of the engine, such that entrained fuel will be transported into the engine along with the air stream.

9. The engine of claim 1, further comprising a controller for controlling the timing of operation of the at least one ignition device.

10. The engine of claim 1, further comprising a combustion force deflector centrally located without interference between the rotors, the deflector being shaped and orientated so as to redirect forces of combustion toward the asymmetrical cavities located in the circumferential faces of the rotors.

11. A non-interference rotary directional pressure engine with no compression stroke, comprising: a substantially sealed case having a rotor section and a gear section; at least one intake port passing through a wall of the case and at least one exhaust port passing through the wall of the case; a plurality of non-contacting rotors adapted to rotate in parallel within rotor wells located in the rotor section of the case and without contact therewith, each rotor coupled to a shaft that extends from the rotor section of the case into the gear section of the case and rotates with its associated rotor; an asymmetrical cavity located on a circumferential face of each rotor, the asymmetrical cavities shaped and located on the rotors so as to become periodically aligned during rotation to form, along with interior walls of the case, a substantially sealed combustion chamber; at least one ignition device protruding into the combustion chamber for igniting an air-fuel mixture located therein; intermeshed timing gears located within the gear section of the case, a timing gear associated with each rotor shaft that extends into the gear section of the case; at least one pair of intermeshed drive gears located in the gear section of the case and associated with a corresponding number of like-rotating rotor shafts; an output gear intermeshed with the drive gears; and an output shaft coupled to the output gear for rotation by rotational movement of the rotors.

12. The engine of claim 11, further comprising bearings for facilitating rotation of the rotor shafts.

13. The engine of claim 11, wherein the asymmetrical cavities located on the circumferential faces of the rotors are shaped so as to move intake air toward the combustion chamber during an intake phase of the engine and to move gases of combustion from the combustion chamber toward the at least one exhaust port during an exhaust phase of the engine.

14. The engine of claim 11, comprising a pair of intake ports, the intake ports being located in the case such that streams of air or other gases entering the case through the intake ports will be caused to collide within the combustion chamber.

15. The engine of claim 11, further comprising a fuel delivery mechanism for delivering a charge of fuel directly to the combustion chamber of the engine during a combustion phase thereof.

16. The engine of claim 11, further comprising a mechanism for adding atomized fuel to an airstream entering the at least one intake port of the engine, such that entrained fuel will be transported into the combustion chamber along with the air stream.

17. The engine of claim 11, further comprising a controller for controlling the timing of operation of the at least one ignition device.

18. The engine of claim 11, further comprising a combustion force deflector centrally located within the combustion chamber, the deflector being shaped and orientated so as to redirect forces of combustion toward the asymmetrical cavities located in the circumferential faces of the rotors.

19. A non-interference rotary directional pressure engine having only an intake stroke, a combustion stroke, and an exhaust stroke, comprising: a substantially sealed case having a rotor section and a gear section; a plurality of non-contacting rotors adapted to rotate in parallel within rotor wells located in the rotor section of the case and without contact therewith, each rotor coupled to a shaft that extends from the rotor section of the case into the gear section of the case and rotates with its associated rotor; an asymmetrical cavity located on a circumferential face of each rotor, the asymmetrical cavities shaped and located on the rotors so as to become periodically aligned during rotor rotation to form, along with interior walls of the case, a substantially sealed combustion chamber; at least one ignition device protruding into the combustion chamber for igniting an air-fuel mixture located therein; a plurality of intake ports entering the case at different locations, the intake ports located such that air or other cases entering the case through the intake ports will be caused to collide within the combustion chamber; at least one exhaust port exiting the case; a combustion force deflector centrally located within the combustion chamber and without interference between the rotors, the deflector being shaped and orientated so as to redirect forces of combustion toward the asymmetrical cavities on the circumferential faces of the rotors; intermeshed timing gears located within the gear section of the case, each timing gear associated with each rotor shaft that extends into the gear section of the case; at least one pair of intermeshed drive gears located in the gear section of the case and associated with a corresponding number of like-rotating rotor shafts; an output gear intermeshed with the drive gears; and an output shaft coupled to the output gear for rotation by rotational movement of the rotors; wherein, the asymmetrical cavities located on the circumferential faces of the rotors are also shaped to move intake air toward the combustion chamber during an intake phase of the engine and to move gases of combustion from the combustion chamber toward the at least one exhaust port during an exhaust phase of the engine.

20. The engine of claim 19, further comprising:
- a mechanism for adding atomized fuel to an airstream entering the intake ports of the engine, such that entrained fuel will be transported into the combustion chamber along with the air stream; and
- a controller for controlling the timing of operation of the at least one ignition device.

* * * * *